(12) United States Patent
Chen et al.

(10) Patent No.: US 12,210,569 B2
(45) Date of Patent: Jan. 28, 2025

(54) VIDEO CLIP POSITIONING METHOD AND APPARATUS, COMPUTER DEVICE, AND STORAGE MEDIUM

(71) Applicant: Tencent Technology (Shenzhen) Company Limited, Shenzhen (CN)

(72) Inventors: Zhenfang Chen, Shenzhen (CN); Lin Ma, Shenzhen (CN); Wenhan Luo, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 377 days.

(21) Appl. No.: 17/384,479

(22) Filed: Jul. 23, 2021

(65) Prior Publication Data

US 2021/0349940 A1    Nov. 11, 2021

Related U.S. Application Data

(63) Continuation of application No. PCT/CN2020/096200, filed on Jun. 15, 2020.

(30) Foreign Application Priority Data

Jun. 17, 2019    (CN) .......................... 201910523085.4

(51) Int. Cl.
*G06F 16/738*    (2019.01)
*G06F 16/74*    (2019.01)
(Continued)

(52) U.S. Cl.
CPC .......... *G06F 16/739* (2019.01); *G06F 16/743* (2019.01); *G06F 16/7844* (2019.01);
(Continued)

(58) Field of Classification Search
None
See application file for complete search history.

(56) References Cited

U.S. PATENT DOCUMENTS

| 2006/0048191 A1* | 3/2006 | Xiong ................ G06V 30/2504 |
| | | 725/52 |
| 2014/0164507 A1* | 6/2014 | Tesch ...................... H04L 51/10 |
| | | 709/204 |

(Continued)

FOREIGN PATENT DOCUMENTS

| CN | 103297851 A | 9/2013 |
| CN | 107027060 A | 8/2017 |

(Continued)

OTHER PUBLICATIONS

Gao, Jiyang, et al. "Tall: Temporal Activity Localization via Language Query," Proceedings of IEEE International Conference on Computer Vision, 2017. (Year: 2017).*

(Continued)

*Primary Examiner* — Hung Q Dang
(74) *Attorney, Agent, or Firm* — Morgan, Lewis & Bockius LLP

(57) ABSTRACT

This application discloses a video clip positioning method performed at a computer device. In this application, the computer device acquires a plurality of video frame features of a target video and a text feature of a target text using a video recognition model to determine a candidate clip that can be matched with the target text. The candidate clip is finely divided based on a degree of matching between a video frame in the candidate clip and the target text to acquire a plurality of sub-clips, and a sub-clip that has the highest degree of matching with the target text is used as a target video clip. According to this application, the video recognition model does not need to learn a boundary feature of the target video clip, and during model training, or (Continued)

precisely label a sample video, thereby shortening a training period of the video recognition model.

17 Claims, 5 Drawing Sheets

(51) Int. Cl.
  *G06F 16/783* (2019.01)
  *G06V 10/74* (2022.01)
  *G06V 10/75* (2022.01)
  *G06V 10/82* (2022.01)
(52) U.S. Cl.
  CPC ............ *G06V 10/75* (2022.01); *G06V 10/761* (2022.01); *G06V 10/82* (2022.01)

(56) References Cited

U.S. PATENT DOCUMENTS

| | | | |
|---|---|---|---|
| 2014/0369596 A1* | 12/2014 | Siskind | G06V 10/85 382/158 |
| 2015/0010288 A1 | 1/2015 | Aggarwal et al. | |
| 2016/0042253 A1* | 2/2016 | Sawhney | G06F 18/2323 382/190 |
| 2017/0110151 A1* | 4/2017 | Matias | G06V 20/41 |
| 2019/0114487 A1* | 4/2019 | Vijayanarasimhan | G06V 20/30 |
| 2019/0304157 A1* | 10/2019 | Amer | G06V 40/23 |
| 2020/0302294 A1* | 9/2020 | Kadav | G06F 16/783 |
| 2020/0356592 A1* | 11/2020 | Yada | G06F 16/538 |

FOREIGN PATENT DOCUMENTS

| | | |
|---|---|---|
| CN | 107704525 A | 2/2018 |
| CN | 108509465 A | 9/2018 |
| CN | 108833973 A | 11/2018 |
| CN | 110121118 A | 8/2019 |
| JP | 2012205097 A | 10/2012 |

OTHER PUBLICATIONS

Babak Farhadi et al., "Creating a Novel Semantic Video Search Engine Through Enrichment Textual and Temporal Features of Subtitled YouTube Media Fragments" 3rd International Conference on Computer and Knowledge Engineering (ICCKE 2013), Oct. 31 & Nov. 1, 2013, Ferdowsi University of Mashhad, 9 pgs.

Tencent Technology, ISR, PCT/CN2020/096200, Sep. 24, 2020, 3 pgs.

Dian Shao et al., "Find and Focus: Retrieve and Localize Video Events with Natural Language Queries", Computer Vision—ECCV 2018, Lecture Notes in Computer Science, vol. 11213, 2018, XP055939184, 17 pgs., Retrieved from the Internet: https://link.springer.com/content/pdf/10.1007/978-3-030-01240-3_13.pdf.

Extended European Search Report, EP20826735.1, Jul. 18, 2022, 10 pgs.

Huijuan Xu et al., "Multilevel Language and Vision Integration for Text-to-Clip Retrieval", arxiv.org, Dec. 25, 2018, XP081196379, 9 pgs., Retrieved from the Internet: https://arxiv.org/pdf/1804.05113.pdf.

Yue Zhao et al., "Temporal Action Detection with Structured Segment Networks", 2017 IEEE International Conference on Computer Vision (ICCV), Oct. 22, 2017, XP055939583, 10 pgs.

Zhenfang Chen et al., "Look Closer to Ground Better: Weakly-Supervised Temporal Grounding of Sentence in Video", arxiv.org, Jan. 25, 20202, XP081585906, 7 pgs., Retrieved from the Internet: https://arxiv.org/pdf/2001.09308.pdf.

Zhenfang Chen et al., "Weakly-Supervised Spatio-Temporally Grounding Natural Sentence in Video", arxiv.org, Jun. 6, 2019, XP081373899, 12 pgs., Retrieved from the Internet: https://arxiv.org/pdf/1906.02549.pdf.

Tencent Technology, WO, PCT/CN2020/096200, Sep. 24, 2020, 5 pgs.

Tencent Technology, IPRP, PCT/CN2020/096200, Dec. 21, 2021, 6 pgs.

* cited by examiner

VIDEO CLIP POSITIONING METHOD AND APPARATUS, COMPUTER DEVICE, AND STORAGE MEDIUM

CROSS-REFERENCE TO RELATED APPLICATION

This application is a continuation application of PCT Patent Application No. PCT/CN2020/096200, entitled "VIDEO CLIP POSITIONING METHOD AND APPARATUS, COMPUTER DEVICE, AND STORAGE MEDIUM" filed on Jun. 15, 2020, which claims priority to Chinese Patent Application No. 201910523085.4, filed with the State Intellectual Property Office of the People's Republic of China on Jun. 17, 2019, and entitled "VIDEO CLIP POSITIONING METHOD AND APPARATUS, COMPUTER DEVICE, AND STORAGE MEDIUM", all of which are incorporated herein by reference in their entirety.

FIELD OF THE TECHNOLOGY

This application relates to the field of video processing technologies, and in particular, to a video clip positioning method and apparatus, a computer device, and a storage medium.

BACKGROUND OF THE DISCLOSURE

With the popularity of video applications, more and more videos appear in networks. When a user wants to watch a video clip in a video, the video may be retrieved based on a piece of text information that can describe the video clip, so as to find the video clip that the user wants to watch.

Currently, when video clip positioning is performed based on a piece of text information, the text information and a video need to be inputted into a video recognition model. The video recognition model outputs, based on a learned boundary feature of a video clip, a video clip that can match the text information. This video recognition model needs to be trained by using a large quantity of sample videos before actual application. In these sample videos, a boundary position of a video clip and text information corresponding to the video clip need to be labeled, so that the video recognition model can learn a boundary feature of the video clip in a training process. However, data labeling is cumbersome, consumes relatively long time, and has relatively low labeling precision, which causes a relatively long training period of the video recognition model, a training result that cannot meet an expected standard, and affected accuracy of video clip positioning in an application process.

SUMMARY

Embodiments of this application provide a video clip positioning method and apparatus, a computer device, and a storage medium, so as to improve accuracy of video clip positioning. The technical solutions are as follows:

According to an aspect, a video clip positioning method is provided, the method including:

determining a candidate clip from a target video based on a plurality of video frames in the target video and a target text, a degree of matching between the candidate clip and the target text meeting a first matching condition;

determining at least one sub-clip from the candidate clip based on a plurality of video frames in the candidate clip and the target text, a degree of matching between a video frame included in the at least one sub-clip and the target text meeting a second matching condition; and determining, as a target video clip, a sub-clip that is in the at least one sub-clip and that has a degree of matching with the target text meeting a target condition.

According to an aspect, a video clip positioning apparatus is provided, the apparatus including:

a candidate clip determining module, configured to determine a candidate clip from a target video based on a plurality of video frames in the target video and a target text, a degree of matching between the candidate clip and the target text meeting a first matching condition;

a sub-clip determining module, configured to determine at least one sub-clip from the candidate clip based on a plurality of video frames in the candidate clip and the target text, a degree of matching between a video frame included in the at least one sub-clip and the target text meeting a second matching condition; and a target video clip determining module, configured to determine, as a target video clip, a sub-clip that is in the at least one sub-clip and that has a degree of matching with the target text meeting a target condition.

According to an aspect, a computer device is provided, where the computer device includes one or more processors and one or more memories, the one or more memories store at least one piece of program code, and the processor is configured to perform the following video clip positioning steps according to the program code:

determining a candidate clip from a target video based on a plurality of video frames in the target video and a target text, a degree of matching between the candidate clip and the target text meeting a first matching condition;

determining at least one sub-clip from the candidate clip based on a plurality of video frames in the candidate clip and the target text, a degree of matching between a video frame included in the at least one sub-clip and the target text meeting a second matching condition; and determining, as a target video clip, a sub-clip that is in the at least one sub-clip and that has a degree of matching with the target text meeting a target condition.

According to an aspect, a computer-readable storage medium is provided, where the computer-readable storage medium stores at least one piece of program code, and the at least one piece of program code is loaded by a processor to perform the following video clip positioning steps:

determining a candidate clip from a target video based on a plurality of video frames in the target video and a target text, a degree of matching between the candidate clip and the target text meeting a first matching condition;

determining at least one sub-clip from the candidate clip based on a plurality of video frames in the candidate clip and the target text, a degree of matching between a video frame included in the at least one sub-clip and the target text meeting a second matching condition; and determining, as a target video clip, a sub-clip that is in the at least one sub-clip and that has a degree of matching with the target text meeting a target condition.

According to the technical solutions provided in the embodiments of this application, a video frame feature of each video frame in a target video and a text feature of a target text are acquired by using a video recognition model, a candidate clip that can be matched with the target text is determined based on rough matching between the video frame feature and the text feature, then the video clip is finely divided based on a degree of matching between a video frame included in the candidate clip and the target text, to acquire a plurality of sub-clips, and a sub-clip that has the highest degree of matching with the target text is determined as a target video clip. By using this rough-to-precise video clip positioning manner, accuracy of video clip positioning can be effectively improved.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following descriptions show only some embodiments of this application, and a person of ordinary skill in the art may still derive other accompanying drawings from the accompanying drawings without creative efforts.

DESCRIPTION OF EMBODIMENTS

To make objectives, technical solutions, and advantages of this application clearer, the following further describes implementations of this application in detail with reference to the accompanying drawings.

Figure 1:
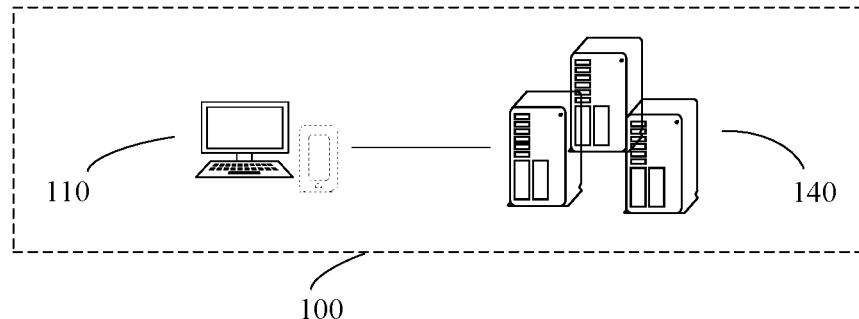
FIG. 1 is a structural block diagram of a video recognition system according to an embodiment of this application.

FIG. 1 is a structural block diagram of a video recognition system according to an embodiment of this application. The video recognition system 100 includes a terminal 110 and a video recognition platform 140.

The terminal 110 may be at least one of a smartphone, a game console, a desktop computer, a tablet computer, an e-book reader, an MP3 player, an MP4 player and a laptop portable computer. An application program that supports video recognition is installed and run on the terminal 110. The application program may be a video retrieval application program, or the like. For example, the terminal 110 is a terminal used by a user, and the application program running on the terminal 110 logs in to a user account.

The terminal 110 is connected to the video recognition platform 140 by using a wireless network or a wired network.

The video recognition platform 140 includes at least one of a server, a plurality of servers, a cloud computing platform, and a virtualization center. The video recognition platform 140 is configured to provide a background service for the application program that supports video recognition. In some embodiments, the video recognition platform 140 undertakes primary recognition work, and the terminal 110 undertakes secondary recognition work. Alternatively, the video recognition platform 140 undertakes secondary recognition work, and the terminal 110 undertakes primary recognition work. Alternatively, the video recognition platform 140 or the terminal 110 may respectively undertake recognition work.

In some embodiments, the video recognition platform 140 includes an access server, a video recognition server, and a database. The access server is configured to provide an access service for the terminal 110. The video recognition server is configured to provide a background service related to video recognition. There may be one or more video recognition servers. When there are a plurality of video recognition servers, at least two video recognition servers are configured to provide different services, and/or at least two video recognition servers are configured to provide the same service, for example, provide the same service in a load balancing manner. This is not limited in this embodiment of this application. A video recognition model may be set in the video recognition server. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The terminal 110 may generally refer to one of a plurality of terminals. In this embodiment, the terminal 110 is merely used as an example for description.

A person skilled in the art may learn that there may be more or fewer terminals. For example, there may be only one terminal, or there may be dozens of or hundreds of or more terminals. In this case, the video recognition system further includes another terminal. The quantity and the device type of the terminals are not limited in the embodiments of this application.

Figure 2:
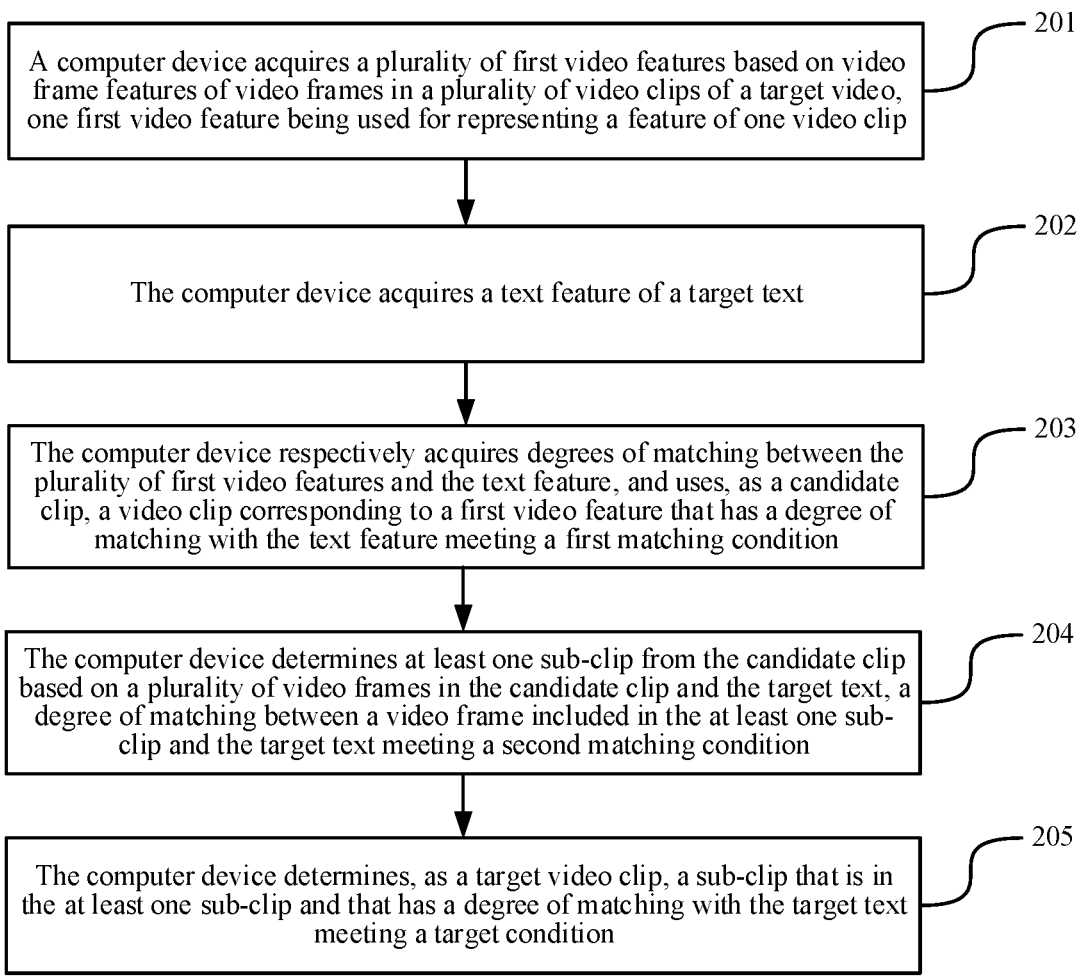
FIG. 2 is a flowchart of a video clip positioning method according to an embodiment of this application.

This application provides a method for performing clip positioning in a video by using a natural language based on weakly-supervised learning. This application may be used for performing clip positioning on a video in a database by using a natural language. For example, given a sentence and a long video, the technical solution of this application may be used for capturing a clip in the long video, and there is a matching semantic relationship between the clip and the given sentence. In a training process, the technical solution of this application does not require precise clip labeling information. The technical solution of this application proposes a rough-to-precise model to handle this problem. First, a neural network and a word vector model are used for respectively performing feature extraction on a single frame of image in the video and a natural language. In a rough phase, a sliding window method is used for generating a series of fixed candidate regions, and features of these candidate regions are matched with a sentence feature to select the most matched candidate region. In a precise phase, a feature of each frame in a rough matching result and the sentence are matched, so as to acquire a matching relationship between the feature of each frame and the sentence, and finally, a final precise matching result is acquired by using a clustering method. In this embodiment of this application, the foregoing technical solution is described in detail by using the following embodiment shown in FIG. 2:

FIG. 2 is a flowchart of a video clip positioning method according to an embodiment of this application. The method is applicable to the foregoing terminal or server, and both the terminal and the server may be considered as computer devices. Therefore, this embodiment of this application is described based on a computer device as an execution body. Referring to FIG. 2, this embodiment may include the following steps:

201. A computer device acquires a plurality of first video features based on video frame features of video frames in a plurality of video clips of the target video, one first video feature being used for representing a feature of one video clip.

The target video may be a video stored in the computer device, may be a video acquired from a server by the computer device, or may be a video collected in real time by a computer device that has a video collection function. This embodiment of this application sets no limitation on a specific type of the video.

In one implementation, the computer device may acquire the target video based on a video retrieval instruction. The video retrieval instruction may be triggered by a retrieval operation performed by a user on a video clip. Certainly, the video retrieval instruction may alternatively be triggered in another manner. This is not limited in this embodiment of this application.

In this embodiment of this application, the computer device may perform feature extraction on the target video by using a video recognition model. The video recognition model may be a model constructed based on a deep neural network. For example, the deep neural network may be a recurrent neural network (RNN), a convolutional neural network (CNN), or the like. The computer device acquires the first video features of the plurality of video clips in the target video based on the video recognition model. In one implementation, a process of acquiring the first video features may include the following steps:

Step 1: The computer device performs feature extraction on each video frame in the target video by using the video recognition model to acquire a plurality of video frame features.

In one implementation, the video recognition model may include a feature encoder. The feature encoder includes at least one convolutional neural network and at least one bidirectional long short-term memory network. The computer device may perform preliminary feature extraction on each video frame in the target video by using the at least one convolutional neural network to acquire convolutional features of the plurality of video frames, and further perform feature extraction on the convolutional features of the plurality of video frames by using the at least one long short-term memory network to acquire video frame features of the plurality of video frames.

In one implementation, one convolutional neural network is used as an example to describe a process of the foregoing preliminary feature extraction. The computer device preprocesses each video frame in the target video, converts each video frame into a digital matrix formed by a group of pixel values, and inputs the digital matrix corresponding to each video frame into the convolutional neural network. The convolutional neural network may include at least one convolutional layer, and the convolutional layer may respectively perform a convolutional operation on the digital matrix corresponding to each video frame. A convolutional operation result may be used for representing a feature map of one video frame. The computer device acquires a plurality of feature maps outputted from the last convolutional layer in the convolutional neural network as a convolutional feature of each video frame. One convolutional layer is used as an example to describe the foregoing convolutional operation process. One convolutional layer may include one or more convolutional kernels. Each convolutional kernel corresponds to one scanning window. A size of the scanning window is the same as a size of the convolutional kernel. In a process of performing a convolutional operation by the convolutional kernel, the scanning window may slide on a feature map according to a target step, and sequentially scan each region of the feature map, where the target step may be set by a developer. One convolutional kernel is used as an example. In a convolutional operation process, when a scanning window of the convolutional kernel slides into any region of a feature map, the computer device reads a value corresponding to each feature point in the region, performs a point multiplication operation on the convolutional kernel and the value corresponding to each feature point, accumulates each product, and uses an accumulation result as a feature point. Then, the scanning window of the convolutional kernel slides to a next region of the feature map according to a target step, a convolutional operation is performed again to output a feature point until all regions of the feature map are scanned, and all outputted feature points form a feature map to be used as input of a next convolutional layer.

A convolutional feature C of the target video acquired by the computer device by using the foregoing preliminary feature extraction process may be represented as the following formula (1):

$$C=\{c_t\}_{t=1}^T \qquad (1)$$

where $c_t$ represents a convolutional feature of a $t^{th}$ video frame in the target video, T represents a quantity of video frames included in the target video, T is an integer greater than 0, and t is an integer greater than 0 and less than or equal to T.

A quantity of convolutional layers in the convolutional neural network and a quantity of convolutional kernels in each convolutional layer may be set by a developer.

To facilitate further feature extraction on each video frame by using the video recognition model, the computer device maps the acquired convolutional feature of each video frame to a vector space, and converts the convolutional feature $c_t$ of the $t^{th}$ video frame into a feature vector $x_t$ of a target dimension, where the target dimension may be set by a developer. In one implementation, the computer device may map the convolutional feature $c_t$ to the feature vector $x_t$ by using a fully connected layer.

The computer device inputs the feature vector $x_t$ outputted by the fully connected layer into a bidirectional long short-term memory network, and further performs feature extraction on each video frame in the target video to acquire a video frame feature of each video frame. The bidirectional long short-term memory network may include an input unit, an output unit, and a hidden layer unit. The input unit may acquire and input a feature vector $x_t$ into the hidden layer unit. The hidden layer unit may perform a weighting operation on the feature vector $x_t$ and a hidden layer state $h_{t-1}$ of a previous hidden layer unit to generate a hidden layer state h t corresponding to the feature vector $x_t$. The output unit may perform a weighting operation on the hidden layer state h t and output a result. The bidirectional long short-term memory network may simultaneously perform a forward operation and a backward operation. For an input feature vector $x_t$, in the forward operation, one hidden layer unit may generate a hidden layer state h t based on a hidden layer state $h_{t-1}$ of a previous hidden layer unit. In the backward operation, one hidden layer unit may generate a hidden layer state h t based on a hidden layer state $h_{t+1}$ of a next hidden layer unit. The computer device acquires the last hidden layer state $\overrightarrow{h_t^v}$ outputted from the forward operation process and the last hidden layer state $\overleftarrow{h_0^v}$ outputted from the backward operation process of the bidirectional long short-term memory network, splices the hidden layer state $\overrightarrow{h_t^v}$ and the hidden layer state $\overleftarrow{h_0^v}$ and uses a spliced hidden layer state as a video frame feature $h_t^v$ of a video frame. The foregoing splicing manner may be splicing the hidden layer state $\overrightarrow{h_t^v}$ and the hidden layer state $\overleftarrow{h_0^v}$ according to a target sequence, where the target sequence may be set by a developer. This is not limited in this embodiment of this application. The foregoing video frame feature acquiring process may be expressed as the following formulas (2), (3), and (4):

$$\overrightarrow{h_t^v} = \overrightarrow{LSTM_v}(x_t, \overrightarrow{h_{t-1}^v}) \tag{2}$$

$$\overleftarrow{h_t^s} = \overleftarrow{LSTM_s}(W_t, \overleftarrow{h_{t+1}^s}) \tag{3}$$

$$h_t^v = \overrightarrow{h_t^v} \| \overleftarrow{h_0^v} \tag{4}$$

where $x_t$ represents the input vector, $\overrightarrow{LSTM_v}(\cdot)$ represents the forward operation process of the bidirectional long short-term memory network, $\overrightarrow{h_t^v}$ represents the hidden layer state acquired in the forward operation, $\overleftarrow{LSTM_v}$ represents the backward operation process of the bidirectional long short-term memory network, $\overleftarrow{h_t^s}$ represents the hidden layer state acquired in the backward operation, $\overrightarrow{h_{t-1}^v}$ represents the hidden layer state of the previous hidden layer unit, and $\overleftarrow{h_{t+1}^s}$ represents the hidden layer state of the next hidden layer unit, where t is an integer greater than 0.

Figure 3:
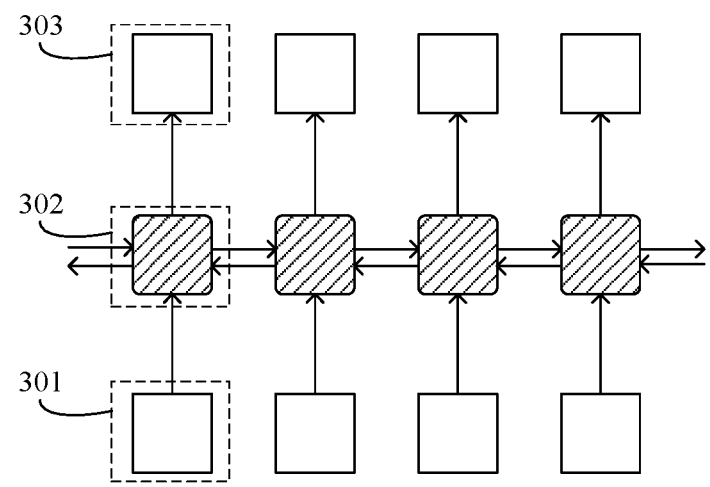
FIG. 3 is a schematic structural diagram of a bidirectional long short-term memory network according to an embodiment of this application.

Referring to FIG. 3, FIG. 3 is a schematic structural diagram of a bidirectional long short-term memory network according to an embodiment of this application. The bidirectional long short-term memory network may include an input unit 301, a hidden layer unit 302, and an output unit 303. The bidirectional long short-term memory network may be configured to perform the foregoing step of further feature extraction on each video frame.

That the computer device acquires a group of video frame features $H_v$ corresponding to the target video may be expressed as the following formula (5):

$$H_v = \{h_t^v\}_{t=1}^T \tag{5}$$

where $h_t^v$ represents a video frame feature of a $t^{th}$ video frame in the target video, and T indicates a quantity of video frames included in the target video.

Step 2: The computer device acquires a plurality of video clips in the target video based on a multi-scale sliding window by using the video recognition model, where two adjacent video clips in the plurality of video clips include an overlapping portion.

In this embodiment of this application, the computer device may scan each region of the target video by using a plurality of sliding windows, and acquire a plurality of video frames in a coverage region of one sliding window as one video clip. After one video clip is acquired, the sliding window may slide according to a sliding step, and continue to scan a next region of the target video. The quantity, size, and sliding step of the sliding window may be set by a developer.

The computer device marks an acquired $k^{th}$ video clip as $p_k$, and the video clip $p_k$ may be represented as the following formula (6):

$$p_k = [t_s^k, t_e^k] \tag{6}$$

where $t_s^k$ represents a start moment of the $k^{th}$ video clip, $t_e^k$ represents an end moment of the $k^{th}$ video clip, values of both the start moment $t_s^k$ and the end moment $t_e^k$ are greater than or equal to 0, and the value of the start moment $t_s^k$ is less than value of the end moment $t_e^k$.

The foregoing video clips with an overlapping portion may ensure natural transition between clips. Certainly, the computer device may further acquire, by performing step 2, a plurality of video clips that do not have an overlapping portion. This is not limited in this embodiment of this application.

Step 3: The computer device may respectively map the video frame features of the video frames in the plurality of video clips, and perform maximum pooling processing on mapped video frame features of the video clips to acquire the plurality of first video features.

In this embodiment of this application, the computer device may map the video frame features of the video frames in the plurality of video clips by using a fully connected layer, and convert a video frame feature $h_t^v$ of a $t^{th}$ video frame into a feature vector $\hat{h}_t^v$. The computer device performs maximum pooling processing on a group of feature vectors $\{\hat{h}_t^v\}_{t=1}^T$ corresponding to the video clip along a time dimension, converts a group of vectors $\{\hat{h}_t^v\}_{t=1}^T$ corresponding to each video clip into a vector $f_k^v$ of a specific dimension, and uses the vector $f_k^v$ of the specific dimension as the first video feature of the video clip. In the foregoing method for performing maximum pooling processing on a group of vectors corresponding to the video clip, video clips of different duration may correspond to vectors of the same dimension, so that the computer device can conveniently performs a subsequent operation process.

202. The computer device acquires a text feature of the target text.

The target text may be a piece of text used for describing a video clip, for example, a piece of text entered by a user when performing video clip retrieval.

In one implementation, the computer device may acquire the target text based on a video retrieval instruction. For example, when retrieving a video clip, the user may enter a target text used for describing the video clip. A trigger operation of the user on a video retrieval control may trigger a video retrieval instruction. The computer device may acquire the target text in response to the video retrieval instruction. The foregoing description of the acquiring method of the target text is merely an example description, and a specific acquiring method of the target text is not limited in this embodiment of this application.

In this embodiment of this application, the computer device may perform feature extraction on the target text based on a long short-term memory network. In one implementation, the process may include the following steps:

Step 1: The computer device may input the target text into the long short-term memory network.

After acquiring the target text, the computer device needs to convert the target text into a group of feature vectors, so as to perform feature extraction on the target text subsequently. In one implementation, the computer device may initialize each word in the target text by using a word vector, and enable each word to correspond to one feature vector $w_n$. The target text may be represented as a group of feature vectors $\{w_n\}_{n=1}^N$, N is a quantity of words included in the target text, n is a sequence number of each word in the target text, N is an integer greater than 0, and n is an integer greater than 0 and less than or equal to N. The word vector may be generated by the computer device, and a dimension of the word vector may be set by a developer.

The computer device inputs the group of feature vectors $\{w_n\}_{n=1}^{N}$ corresponding to the target text into the bidirectional long short-term memory network to perform feature extraction.

Step 2: The computer device acquires a plurality of target hidden layer states generated by the long short-term memory network as the text feature of the target text.

In this embodiment of this application, the long short-term memory network may be a bidirectional long short-term memory network, so that when text feature extraction is performed, context information can be fully considered, thereby improving accuracy of text feature extraction.

A specific method for acquiring the text feature by the computer device based on the bidirectional long short-term memory network is the same as the method for acquiring the video frame feature by the bidirectional long short-term memory network in step 201, and details are not described herein again. The computer device marks the acquired text feature as $h^s$, and a manner of acquiring the text feature $h^s$ may be expressed as the following formulas (7), (8), and (9):

$$\overrightarrow{h_n^s} = \overrightarrow{LSTM_s}(w_n, \overrightarrow{h_{n-1}^s}) \tag{2}$$

$$\overleftarrow{h_n^s} = \overleftarrow{LSTM_s}(w_n, \overleftarrow{h_{n+1}^s}) \tag{8}$$

$$h^s = \overrightarrow{h_N^s} \| \overleftarrow{h_0^s} \tag{9}$$

where $w_n$ represents a feature vector of a word, $\overrightarrow{LSTM_s}(\cdot)$ represents the forward operation process of the bidirectional long short-term memory network, $\overrightarrow{h_s^n}$ represents the hidden layer state acquired in the forward operation, $\overleftarrow{LSTM_s}$ represents the backward operation process of the bidirectional long short-term memory network, $\overleftarrow{h_n^s}$ represents the hidden layer state acquired in the backward operation, $\overrightarrow{h_{n-1}^s}$ represents the hidden layer state of the previous hidden layer unit, and $\overleftarrow{h_{n+1}^s}$ represents the hidden layer state of the next hidden layer unit, where n is an integer greater than 0.

In this embodiment of this application, the computer device completes, by using an encoder, the process of encoding the target video and the target text, so as to generate a plurality of video frame features of the target video and the text feature of the target text. In the foregoing encoding process of the target video, the encoder may be implemented as a convolutional neural network configured to perform preliminary feature extraction and a bidirectional long short-term memory network configured to perform further feature extraction. In the foregoing encoding process of the target text, the encoder may be implemented as a bidirectional long short-term memory network. In this embodiment of this application, the bidirectional long short-term memory network is used in the encoding process, so that the encoder can fully use the context information of the target video and the target text to improve encoding accuracy, and further, when video clip positioning is performed based on the video feature and the text feature that are acquired in the encoding process, positioning result accuracy can be ensured.

In this embodiment of this application, an execution sequence of first acquiring the feature of the video clip and then acquiring the text feature is used. However, in some embodiments, the text feature may be first acquired, and then the feature of the video clip is acquired, or two steps are simultaneously performed. This is not specifically limited in this embodiment of this application.

203. The computer device respectively acquires degrees of matching between the plurality of first video features and the text feature, and uses, as the candidate clip, a video clip corresponding to a first video feature that has a degree of matching with the text feature meeting the first matching condition.

The computer device acquires the candidate clip based on the plurality of first video features and the text feature. In one implementation, the process may include the following steps:

Step 1: The computer device determines the degrees of matching between the plurality of first video features and the text feature based on the plurality of first video features and the text feature.

To improve matching result accuracy, before matching the plurality of first video features with the text feature, the computer device may extract key information from the plurality of first video features and the text feature. In this embodiment of this application, the computer device may extract key information by using a gating operation. The gating operation may be implemented by using a sigmoid function. The computer device may filter out irrelevant information in the plurality of first video features and the text feature by using a plurality of parameters in the sigmoid function, and respectively perform a point multiplication operation on an operation result of the sigmoid function and the plurality of first video features and the text feature to acquire the first video feature $\hat{f}_k^v$ and the text feature $\hat{f}_k^s$. The foregoing process of extracting key information from the plurality of first video features and the text feature may be expressed as the following formulas (10), (11), (12), and (13):

$$g_v = \sigma(W_v(f_k^v \| f^s) + b_v) \tag{10}$$

$$\hat{f}_k^v = (f_k^v) \cdot g_v \tag{11}$$

$$g_s = \sigma(W_s(f_k^v \| f^s) + b_s) \tag{12}$$

$$\hat{f}_k^s = (f^s) \cdot g_s \tag{13}$$

where σ represents the sigmoid (S-type growth curve) function, $W_v$, $W_s$, $b_v$, and $b_s$ respectively represent one parameter value, all of $W_v$, $W_s$, $b_v$, and $b_s$ may be obtained by using a model training process, and "∥" representing splicing of two sequences. "·" represents a point multiplication operation, and $g_v$ and $g_s$ represent matrices acquired after the computer device performs a weighting operation on the video feature and the text feature.

The computer device may determine, based on a matching function φ, a degree of matching between each video clip and the target text. The matching function φ may have a plurality of implementations. In one implementation, the matching function φ may determine the degree of matching between each video clip and the target text in the following manner: First, the matching function adds an element at a corresponding position in a feature $\hat{f}_k^v$ corresponding to a video clip $p_k$ and an element at a corresponding position in the feature $\hat{f}_k^s$ corresponding to the target text, to acquire a first operation result; multiplies the element at the corresponding position in the feature $\hat{f}_k^v$ corresponding to the video clip $p_k$ and the element at the corresponding position in the feature $\hat{f}_k^s$ corresponding to the target text, to acquire a second operation result; splices the feature $\hat{f}_k^v$ corresponding to the video clip $p_k$ and the feature $\hat{f}_k^s$ corresponding to the target text to acquire a third operation result; then splices the first operation result, the second operation result, and the third operation result to acquire a fourth operation result; and finally, maps the fourth operation result as a value by using a fully connected layer. The value is used for indicating a degree of matching between the video clip $p_k$ and the target text. The foregoing splicing process may be connecting all features head-to-tail, or certainly, the features may be spliced in another manner. This is not limited in this embodiment of this application. The foregoing description of the implementation of the matching function $\varphi$ is merely an example description, and a specific implementation of the matching function $\varphi$ is not limited in this embodiment of this application.

Step 2: The computer device uses, as the candidate clip, a video clip corresponding to a first video feature that has a degree of matching with the text feature meeting the first matching condition.

The computer device acquires a plurality of degrees of matching between each video clip in the target video and the target text, sorts the plurality of degrees of matching by values, and uses, as the candidate clip, a video clip that has the maximum degree value of matching with the target text. The computer device may mark the candidate clip as $p_c$.

The computer device completes a rough positioning process through rough interaction between the video frame feature of each video frame in the target video and the text feature, and acquires the candidate clip from the target video.

Step 201 to step 203 are a process of determining the candidate clip from the target video based on the plurality of video frames in the target video and the target text, the degree of matching between the candidate clip and the target text meeting the first matching condition. During implementation of this application, the foregoing process of acquiring the candidate clip is a rough matching process. In this embodiment of this application, the computer device may perform a precise matching step based on a rough matching result, that is, perform precise matching only on the selected candidate clip and the target text. On the one hand, an operation amount in a subsequent matching process can be reduced, and on the other hand, video frames in the candidate video clip are further screened, thereby improving accuracy of a final video clip positioning result.

204. The computer device determines at least one sub-clip from the candidate clip based on a plurality of video frames in the candidate clip and the target text, a degree of matching between a video frame included in the at least one sub-clip and the target text meeting a second matching condition.

In one implementation, to improve accuracy of a video clip positioning result, before the computer device acquires the at least one sub-clip from the candidate clip, the computer device may perform boundary extension on the candidate clip to acquire a candidate clip that includes more video frames. In one implementation, the computer device may perform boundary extension on the candidate clip based on a start moment and an end moment of the candidate clip in the target video. In one implementation, the computer device may perform boundary extension on the candidate clip by using a boundary extension function. The boundary extension function may adjust a boundary of the candidate clip based on duration of the candidate clip and the start moment and the end moment of the candidate clip. The boundary extension function may be expressed as the following formula (14):

$$\begin{cases} t_s'^c = \max(t_s^c - \tau \times l_\Delta, 0) \\ t_c'^c = \max(t_e^c + \tau \times l_\Delta, l_v') \end{cases} \quad (14)$$

where $l_\Delta$ represents a length of a candidate clip $p_c$; $l_v'$ represents duration of the target video; $\tau$ represents a value used for controlling a boundary extension degree, where the value may be set by a developer, or may be obtained by using a training process of the video recognition model, $t_s'^c$ represents a start moment of the candidate clip after boundary extension, $t_e'^c$ represents an end moment of the candidate clip after boundary extension, $t_s^c$ represents a start moment of the candidate clip before boundary extension, and $t_e^c$ represents an end moment of the candidate clip before boundary extension.

The computer device may mark the candidate clip after boundary extension as $p'_c$, where a start moment of the candidate clip $p'_c$ is $t_s'^c$, and an end moment of the candidate clip is $t_e'^c$. In this embodiment of this application, the boundary of the candidate clip acquired in the rough matching process is adjusted by using the boundary extension method, so as to avoid the loss of important video frames due to an error of the rough matching stage, thereby improving fault tolerance, and further ensuring accuracy of a subsequent precise matching result.

The process that the computer device determines at least one sub-clip from the candidate clip $p'_c$ after boundary extension may include the following steps in one implementation:

Step 1: The computer device respectively acquires degrees of matching between video frame features of the plurality of video frames in the candidate clip and the text feature.

The computer device respectively maps the video frame features of the plurality of video frames in the candidate clip and the text feature to a vector space, and extracts key information from mapping results to acquire a plurality of intermediate video frame features and an intermediate text feature. In one implementation, the computer device may map a video frame feature $h_t^v$ of a video frame at moment t in the candidate clip as a vector by using a fully connected layer, and map the text feature $h^s$ as a vector $f_t'^s$. The computer device may extract key information from a mapping result of the fully connected layer by using a gating operation, to acquire the intermediate video frame feature $\hat{f}_t'^v$ of each video frame and the intermediate text feature $\hat{f}_t'^s$ of the target text. The gating operation is the same as the gating operation applied in step 203, and details are not described herein again.

The computer device determines the degrees of matching between the video frame features of the plurality of video frames and the text feature based on the plurality of intermediate video frame features and the intermediate text feature. In this embodiment of this application, the computer device may determine the degree of matching between each video clip and the target text based on a matching function $\varphi'$. A specific implementation of the matching function $\varphi'$ is the same as the implementation of the matching function $\varphi$ in step 203, and details are not described herein again.

Step 2: The computer device acquires a plurality of target video frames from the plurality of video frames, a degree of matching between a video frame feature of one target video frame and the text feature meeting the second matching condition.

In one implementation, the computer device may perform normalization processing on the degrees of matching between the video frame features of the plurality of video frames and the text feature, so that a value corresponding to each degree of matching ranges from [0, 1]. The computer device may cluster normalized degrees of matching by using a watershed algorithm, that is, may acquire at least one degree of matching in an impact region of a local minimum value in the algorithm by using the watershed algorithm, remove a video frame corresponding to the at least one degree of matching, and use a remaining video frame in the video clip as a target video frame that has a degree of matching with the text feature meeting the second matching condition. The foregoing description of the method for acquiring the target video frame is merely an example description. This embodiment of this application sets no limitation on a specific method for acquiring the target video frame.

Step 3: The computer device determines the at least one sub-clip based on at least one group of consecutive video frames in the plurality of target video frames.

In one implementation, the computer device uses, for each group of consecutive video frames, the first video frame in the group of consecutive video frames as a start video frame, and uses the last video frame as an end frame, to acquire a sub-clip corresponding to the group of consecutive video frames. The computer device may mark the sub-clip as $p_f$, a start moment of the sub-clip $p_f$ as $t'_s$, and an end moment of the sub-clip as $t_e^f$.

205. The computer device determines, as a target video clip, a sub-clip that is in the at least one sub-clip and that has a degree of matching with the target text meeting a target condition.

In one implementation, step 205 may include the following steps:

Step 1: The computer device acquires a degree of matching between each sub-clip and the target text.

The computer device may determine the degree of matching between each sub-clip and the target text based on a matching relationship between each frame in the sub-clip and a similarity between the candidate clip and the sub-clip, which may be expressed as the following formula (15):

$$m(p_f, S) = \frac{1}{t_e^f - t_s^f + 1} \sum_{t=t_s^f}^{t_e^f} m'_t + \beta \times tIoU(p_c, p_f) \qquad (15)$$

where $p_f$ represents a sub-clip, S represents the target text, $m(p_f, S)$ represents a degree of matching between the sub-clip and the target text, $m'_t$ represents a degree of matching between a $t^{th}$ frame in the sub-clip and the target text, t is an integer greater than 0, $t_s^f$ represents a start moment of the sub-clip $p_f$, $t_e^f$ represents an end moment of the sub-clip $p_f$, β represents a preset parameter, a value of the preset parameter may be set by a developer, in this embodiment of this application, β may be set to 1, $p_c$ represents a candidate clip, and $tIoU(p_c, p_f)$ is used for representing a degree of coincidence between t and $(p_c, p_f)$. In the foregoing formula, the first term may be used for measuring a matching relationship between each video frame in the sub-clip and the target text, and the second term may be used for measuring a similarity between the candidate clip and the sub-clip.

Step 2: The computer device determines, as a target video clip, a sub-clip that has a degree of matching with the target text meeting a target condition.

The computer device sorts the degrees of matching between each sub-clip and the target text by values, and uses, as the target video clip, a sub-clip that has the largest degree value of matching with the target text.

The computer device completes a fine positioning process through fine interaction between the video frame feature of each video frame in the candidate clip and the text feature, and determines the target video clip from the candidate clip. In this embodiment of this application, each video frame in the candidate clip is matched with the target text by using the fine positioning process, and each video frame in the candidate clip is screened again to acquire an accurate target video clip, that is, positioning accuracy of the target video clip is improved by using a plurality of times of feature matching.

Figure 4:
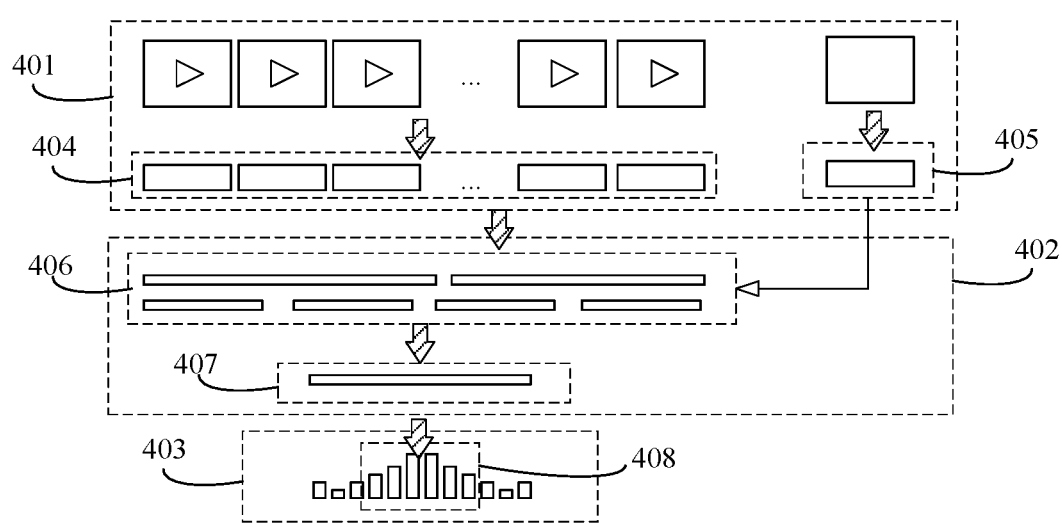
FIG. 4 is a framework diagram of a video clip positioning method according to an embodiment of this application.

FIG. 4 provides a framework diagram of a video clip positioning method. Referring to FIG. 4, the video clip positioning process includes a feature encoding process 401, a rough interaction process 402, and a fine interaction process 403. For a video clip and a natural language sentence, the computer device may acquire a series of time candidate regions by using an encoding process, extract a video and the target text to perform feature extraction, acquire a plurality of video frame features 404 and a text feature 405, perform rough positioning on a video clip corresponding to the target text by using a rough interaction process so as to acquire a candidate clip 407 from a plurality of video clips 406, perform fine division on the candidate clip by using a fine interaction process, and acquire a final fine result through clustering, that is, acquire a target video clip 408. In this embodiment of this application, supervised learning is respectively performed in a rough phase and a fine phase by using a sorting loss function (for details, refer to the following training process embodiment). During a test, feature extraction is first performed by using a feature encoder, a rough matching result is acquired by using the rough phase, and a final matching result is acquired by performing fine interaction on a video clip of the rough result.

According to the technical solution provided in this embodiment of this application, the video frame feature of each video frame in the target video and the text feature of the target text are acquired by using the video recognition model, a candidate clip that can be matched with the target text is determined, then the video clip is finely divided based on a degree of matching between a video frame included in the candidate clip and the target text, to acquire a plurality of sub-clips, and a sub-clip that has the highest degree of matching with the target text is determined as a target video clip. In such a manner of accurately acquiring the target video clip by further dividing the selected candidate clip through a plurality of times of feature matching, the video recognition model does not need to learn a boundary feature of the target video clip, and it is unnecessary to precisely label a sample video, thereby shortening a training period of the video recognition model, and avoiding a problem that a model output result has low accuracy due to inaccurate labeling of the sample video.

According to the technical solution provided in this embodiment of this application, a video content understanding and positioning service may be provided. On a background server, an encoder first generates a series of fixed candidate regions by using a sliding window, and then respectively extracts a visual feature and a text feature by using a neural network and a word vector model to measure a matching relationship between a sentence and a candidate region, so as to acquire a rough time slice that matches a sentence in a long video; and after the rough time slice is acquired, performs fine tuning on each frame in the rough time slice to finally acquire a precise time slice that matches the sentence in the long video. The technical solution provided in this embodiment of this application can greatly improve an existing video understanding capability, and can be deployed on a video website for video classification, quick retrieval, and time slice positioning.

The foregoing embodiment describes a process of performing video clip positioning by the computer device. Before video clip positioning is performed, the video recognition model needs to be trained, so as to adjust parameters in the video recognition model. In this embodiment of this application, the parameters in the video recognition model may be adjusted by using a sorting loss function. A training process of the video recognition model may include the following steps:

Step 1: The computer device initializes each parameter in the video recognition model.

In one implementation, the computer device randomly assigns values to the parameters of the video recognition model to implement parameter initialization. Certainly, the computer device may further perform parameter initialization on the video recognition model in another manner. This is not limited in this embodiment of this application.

Step 2: The computer device inputs a training data set into the video recognition model.

The training data set may include a plurality of sample videos, the plurality of sample videos are labeled sample videos, and each sample video is labeled with text information corresponding to the sample video.

The computer device inputs the plurality of sample videos into the video recognition model, where the video recognition model outputs, based on feature matching between the sample videos and the text information, a target video clip positioned by using the text information.

Step 3: The computer device acquires a recognition result of the video recognition model, calculates an error between a positioning result of the video clip and a correct recognition result by using a sorting loss function, and adjusts each parameter in the video recognition model based on a calculation result of the sorting loss function, to acquire a trained video recognition model when a preset condition is met.

In this embodiment of this application, the computer device may first adjust parameters involved in a candidate clip acquiring phase, and then adjust parameters involved in a target video clip acquiring phase after adjusting the parameters involved in the candidate clip acquiring phase, and when an error between a positioning result of the video clip and the correct recognition result is less than an error threshold, the computer device determines that training of the video recognition model is completed. The error threshold may be set by a developer.

In one implementation, the computer device may adjust the parameters involved in the candidate clip acquiring phase by using the sorting loss function. In one implementation, the computer device may mark the degree of matching between the candidate clip and the target text as m(V, S), and the degree of matching m(V, S) may be expressed as the following formula (16):

$$m(V,S)=\max(m(p_k,S)) \quad (16)$$

where V and S represent a pair of video clip and text information that can be matched with each other, max(') represents a maximization function, $p_k$ represents a $k^{th}$ video clip, and $m(p_k, S)$ represents a degree of matching between the video clip $p_k$ and the target text S.

In this embodiment of this application, the sorting loss function may be expressed as the following formula (17):

$$L_{corse}=\Sigma_{V'\ne V}\Sigma_{S'\ne S}[\max(0,m)(V,S')-m(V,S)+\Delta)+\max(0, m(V',S)-m(V,S)+\Delta)] \quad (17)$$

where Δ represents a constant, V and S represent a pair of video clip and text information that can be matched with each other, V' represents a video clip that does not match the text information S, and S' represents text information that does not match the video clip V.

In one implementation, the computer device may adjust the parameters involved in the target video clip acquiring phase by using the sorting loss function. In one implementation, the computer device marks the candidate clip after boundary extension as $p'_c$, and $p'_c$ may be expressed as the following formula (18):

$$p'_c=[t_s'^c,t_e'^c] \quad (18)$$

where $t_s'^c$ represents a start moment of the candidate clip after boundary extension, $t_e'^c$ represents an end moment of the candidate clip after boundary extension, values of both $t_s'^c$ and $t_e'^c$ are greater than 0, and the value of $t_e'^c$ is greater than that of $t_s'^c$.

The computer device may mark, as m'(V, S), a degree of matching between each video frame in the candidate clip $p'_c$ after boundary extension and the target text, where the degree of matching m'(V, S) may be expressed as the following formula (19):

$$m'(V,S)=\max(m'(p'_t,S)) \quad (19)$$

where V and S represent a pair of sub-clip and text information that can be matched with each other, max(') represents a maximization function, $p'_t$ represents a $t^{th}$ video frame, and $m'(p'_t, S)$ represents a degree of matching between the sub-clip and the target text S.

In this embodiment of this application, the sorting loss function may be expressed as the following formula (20):

$$L_{fine}=\Sigma_{V'\ne V}\Sigma_{S'\ne S}[\max(0,m)(V,S')-m(V,S)+\Delta)+\max(0,m'(V',S)-m'(V,S)+\Delta)] \quad (20)$$

where Δ represents a constant, V and S represent a pair of video clip and text information that can be matched with each other, V' represents a video clip that does not match the text information S, and S' represents text information that does not match the video clip V.

After parameter adjustment is performed on the video clip positioning model by using the sorting loss function, the degree of matching m(V, S) between a video clip and text information that match each other is far greater than the degrees of matching m(V, S') and m(V', S) between a video clip and text information that do not match each other, and output result accuracy of the video clip positioning model is higher.

In the foregoing training process of the video recognition model, a weakly supervised learning manner is used for training the model. The training process is not dependent on boundary information of a video clip that matches the target text in the target video. Instead, the training process is divided into two stages: A rough stage is first trained, that is, parameters of a candidate clip acquiring stage are first trained, and a fine stage is then trained, that is, parameters of a target video clip acquiring stage are then trained. In this model training manner, a requirement for labeling accuracy of a training data set is low, and it is unnecessary to label each video clip precisely in the training data set, thereby reducing time consumption of model training and improving model training efficiency.

Figure 5:
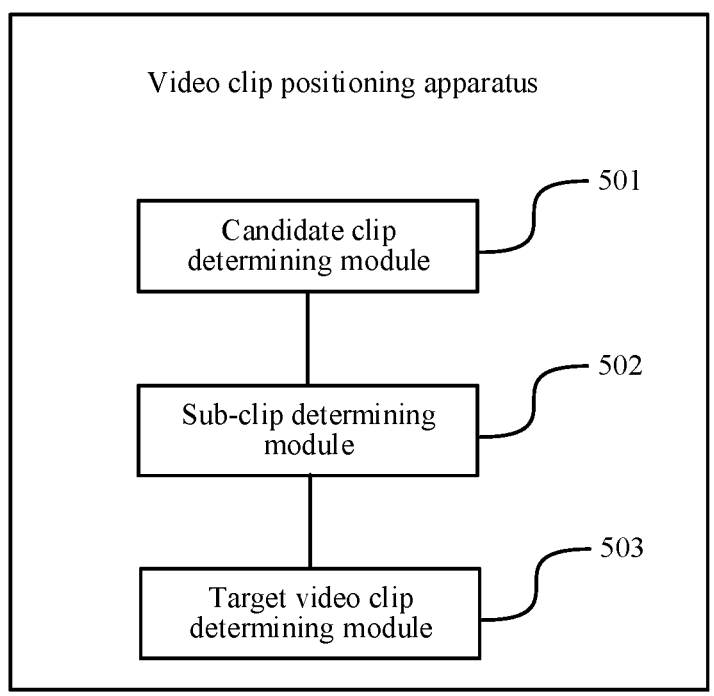
FIG. 5 is a schematic structural diagram of a video clip positioning apparatus according to an embodiment of this application.

FIG. 5 is a schematic structural diagram of a video clip positioning apparatus according to an embodiment of this application. Referring to FIG. 5, the apparatus includes:

a candidate clip determining module 501, configured to determine a candidate clip from a target video based on a plurality of video frames in the target video and a target text, a degree of matching between the candidate clip and the target text meeting a first matching condition;

a sub-clip determining module 502, configured to determine at least one sub-clip from the candidate clip based on a plurality of video frames in the candidate clip and the target text, a degree of matching between a video frame included in the at least one sub-clip and the target text meeting a second matching condition; and a target video clip determining module 503, configured to determine, as a target video clip, a sub-clip that is in the at least one sub-clip and that has a degree of matching with the target text meeting a target condition.

In one implementation, the sub-clip determining module 502 is configured to:

respectively acquire degrees of matching between video frame features of the plurality of video frames in the candidate clip and a text feature;

acquire a plurality of target video frames from the plurality of video frames, a degree of matching between a video frame feature of one target video frame and the text feature meeting the second matching condition; and determine the at least one sub-clip based on at least one group of consecutive video frames in the plurality of target video frames.

In one implementation, the sub-clip determining module 502 is configured to:

use, for each group of consecutive video frames, the first video frame in the group of consecutive video frames as a start video frame, and use the last video frame as an end frame, to acquire a sub-clip corresponding to the group of consecutive video frames.

In one implementation, the sub-clip determining module 502 is configured to:

respectively map the video frame features of the plurality of video frames in the candidate clip and the text feature to a vector space, and extract key information from mapping results to acquire a plurality of intermediate video frame features and an intermediate text feature; and determine the degrees of matching between the video frame features of the plurality of video frames and the text feature based on the plurality of intermediate video frame features and the intermediate text feature.

In one implementation, the apparatus further includes:

a boundary extension module, configured to perform boundary extension on the candidate clip based on a start moment and an end moment of the candidate clip in the target video.

In one implementation, the candidate clip determining module 501 is configured to:

acquire a plurality of first video features based on video frame features of video frames in a plurality of video clips of the target video, one first video feature being used for representing a feature of one video clip;

acquire a text feature of the target text; and respectively acquire degrees of matching between the plurality of first video features and the text feature, and use, as the candidate clip, a video clip corresponding to a first video feature that has a degree of matching with the text feature meeting the first matching condition.

In one implementation, two adjacent video clips of the plurality of video clips have an overlapping portion.

In one implementation, the candidate clip determining module 501 is configured to:

respectively map the video frame features of the video frames in the plurality of video clips, and perform maximum pooling processing on mapped video frame features of the video clips to acquire the plurality of first video features.

In one implementation, the candidate clip determining module 501 is configured to:

input the target text into a long short-term memory network; and acquire a plurality of target hidden layer states generated by the long short-term memory network as the text feature of the target text.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. All of the above-mentioned technical solutions may be combined in different manners to form other embodiments of this application, and details are not described herein again.

The apparatus provided in this embodiment of this application may provide a video content understanding and positioning service. On a background server, an encoder first generates a series of fixed candidate regions by using a sliding window, and then respectively extracts a visual feature and a text feature by using a neural network and a word vector model to measure a matching relationship between a sentence and a candidate region, so as to acquire a rough time slice that matches a sentence in a long video; and after the rough time slice is acquired, performs fine tuning on each frame in the rough time slice to finally acquire a precise time slice that matches the sentence in the long video. The apparatus provided in this embodiment of this application can greatly improve an existing video understanding capability, and can be deployed on a video website for video classification, quick retrieval, and time slice positioning.

When the video clip positioning apparatus provided in the foregoing embodiments performs video clip positioning, division of the foregoing functional modules is merely an example for description. In an actual application, the foregoing functions may be assigned to and completed by different functional modules as needed, that is, the internal structure of the apparatus is divided into different functional modules to implement all or some of the functions described above. In addition, the video clip positioning apparatus provided in the foregoing embodiment belongs to the same conception as the video clip positioning method in the foregoing embodiments. For the specific implementation process, refer to the method embodiments, and the details are not described herein again.

Figure 6:
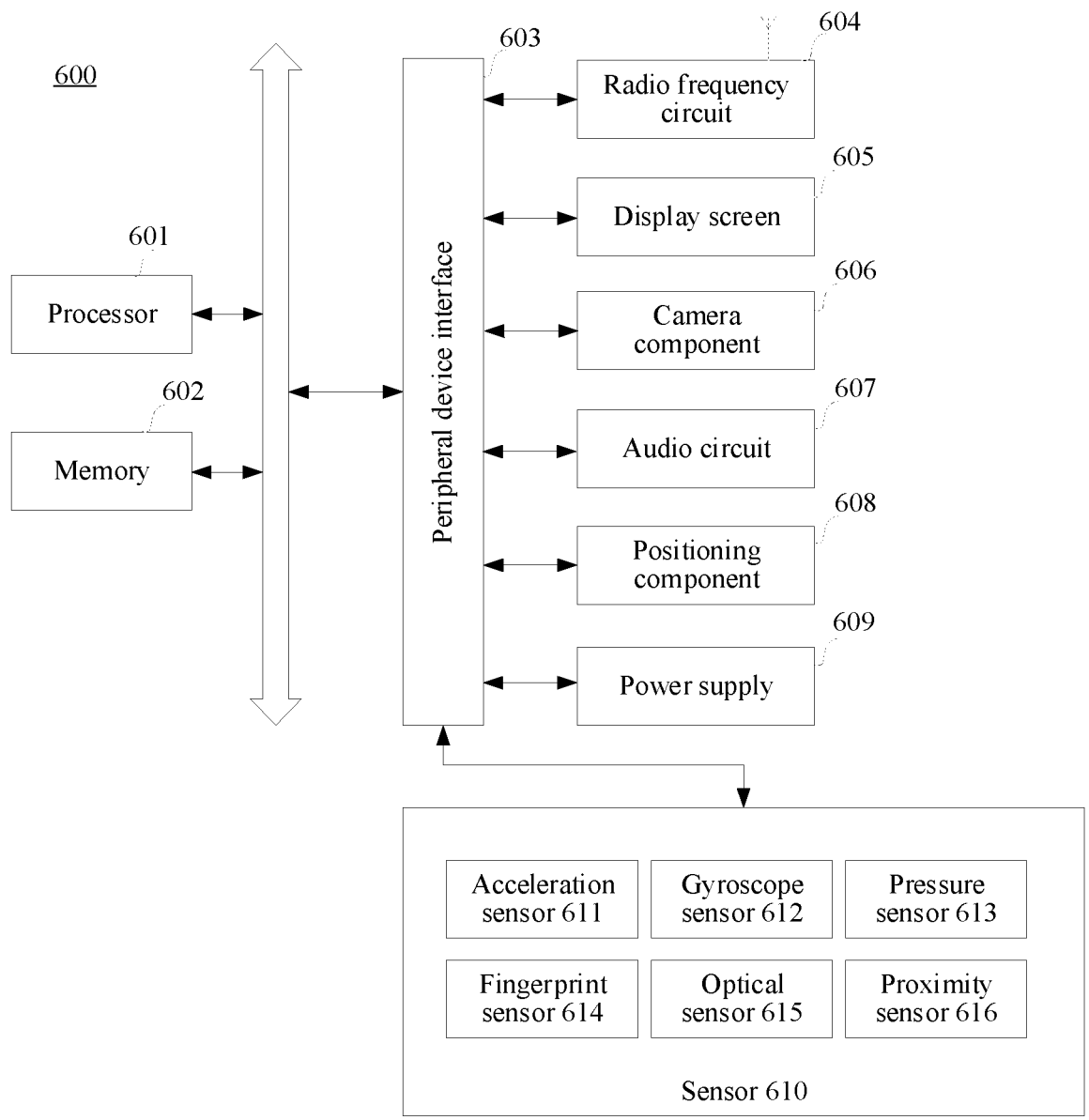
FIG. 6 is a schematic structural diagram of a terminal according to an embodiment of this application.

The computer device provided in the foregoing technical solution may be implemented as a terminal or a server. For example, FIG. 6 is a schematic structural diagram of a terminal according to an embodiment of this application. The terminal 600 may be a smartphone, a tablet computer, a Moving Picture Experts Group Audio Layer III (MP3)

player, a Moving Picture Experts Group Audio Layer IV (MP4) player, a notebook computer, or a desktop computer. The terminal 600 may also be referred to other names such as a user device, or a portable terminal, a laptop computer, or a desktop terminal.

Generally, the terminal 600 includes one or more processors 601 and one or more memories 602. The processor 601 may include one or more processing cores, and may be, for example, a 4-core processor or an 8-core processor. The processor 601 may be implemented in at least one hardware form of a digital signal processor (DSP), a field-programmable gate array (FPGA), and a programmable logic array (PLA). The processor 601 may alternatively include a main processor and a coprocessor. The main processor is a processor configured to process data in an awake state, and is also referred to as a central processing unit (CPU). The coprocessor is a low power consumption processor configured to process the data in a standby state. In some embodiments, the processor 601 may be integrated with a graphics processing unit (GPU). The GPU is configured to be responsible for rendering and drawing content that a display needs to display. In some embodiments, the processor 601 may further include an artificial intelligence (AI) processor. The AI processor is configured to process a computing operation related to machine learning.

The memory 602 may include one or more computer-readable storage media. The computer-readable storage media may be non-transient or non-transitory. The memory 602 may further include a high-speed random access memory (RAM) and a non-volatile memory, for example, one or more disk storage devices or flash memory devices. In some embodiments, a non-transient or non-transitory computer-readable storage medium in the memory 602 is configured to store at least one piece of program code, and the processor is configured to perform the following video clip positioning steps according to the program code:

determining a candidate clip from a target video based on a plurality of video frames in the target video and a target text, a degree of matching between the candidate clip and the target text meeting a first matching condition;

determining at least one sub-clip from the candidate clip based on a plurality of video frames in the candidate clip and the target text, a degree of matching between a video frame included in the at least one sub-clip and the target text meeting a second matching condition; and determining, as a target video clip, a sub-clip that is in the at least one sub-clip and that has a degree of matching with the target text meeting a target condition.

In one implementation, the processor is configured to perform the following steps according to the program code:

respectively acquiring degrees of matching between video frame features of the plurality of video frames in the candidate clip and a text feature;

acquiring a plurality of target video frames from the plurality of video frames, a degree of matching between a video frame feature of one target video frame and the text feature meeting the second matching condition; and determining the at least one sub-clip based on at least one group of consecutive video frames in the plurality of target video frames.

In one implementation, the processor is configured to perform the following steps according to the program code:

using, for each group of consecutive video frames, the first video frame in the group of consecutive video frames as a start video frame, and using the last video frame as an end frame, to acquire a sub-clip corresponding to the group of consecutive video frames.

In one implementation, the processor is configured to perform the following steps according to the program code:

respectively mapping the video frame features of the plurality of video frames in the candidate clip and the text feature to a vector space, and extracting key information from mapping results to acquire a plurality of intermediate video frame features and an intermediate text feature; and determining the degrees of matching between the video frame features of the plurality of video frames and the text feature based on the plurality of intermediate video frame features and the intermediate text feature.

In one implementation, the processor is configured to perform the following step according to the program code:

performing boundary extension on the candidate clip based on a start moment and an end moment of the candidate clip in the target video.

In one implementation, the processor is configured to perform the following steps according to the program code:

acquiring a plurality of first video features based on video frame features of video frames in a plurality of video clips of the target video, one first video feature being used for representing a feature of one video clip;

acquiring a text feature of the target text; and respectively acquiring degrees of matching between the plurality of first video features and the text feature, and using, as the candidate clip, a video clip corresponding to a first video feature that has a degree of matching with the text feature meeting the first matching condition.

In one implementation, two adjacent video clips of the plurality of video clips have an overlapping portion.

In one implementation, the processor is configured to perform the following step according to the program code:

respectively mapping the video frame features of the video frames in the plurality of video clips, and performing maximum pooling processing on mapped video frame features of the video clips to acquire the plurality of first video features.

In one implementation, the processor is configured to perform the following steps according to the program code:

inputting the target text into a long short-term memory network; and acquiring a plurality of target hidden layer states generated by the long short-term memory network as the text feature of the target text.

In some embodiments, the terminal 600 may alternatively include: a peripheral device interface 603 and at least one peripheral device. The processor 601, the memory 602, and the peripheral device interface 603 may be connected through a bus or a signal cable. Each peripheral device may be connected to the peripheral device interface 603 through a bus, a signal cable, or a circuit board. Specifically, the peripheral device includes: at least one of a radio frequency (RF) circuit 604, a display screen 605, a camera component 606, an audio circuit 607, a positioning component 608, and a power source 609.

The peripheral device interface 603 may be configured to connect at least one peripheral device related to input/output (I/O) to the processor 601 and the memory 602. In some embodiments, the processor 601, the memory 602, and the peripheral device interface 603 are integrated into the same chip or circuit board. In some other embodiments, any one or two of the processor 601, the memory 602, and the peripheral device interface 603 may be implemented on an independent chip or circuit board, and the implementation is not limited in this embodiment.

The RF circuit 604 is configured to receive and transmit a RF signal, also referred to as an electromagnetic signal. The RF circuit 604 communicates with a communication network and other communication devices by using the electromagnetic signal. The RF circuit 604 may convert an electric signal into an electromagnetic signal for transmission, or convert a received electromagnetic signal into an electric signal. In some embodiments, the RF circuit 604 includes an antenna system, an RF transceiver, one or more amplifiers, a tuner, an oscillator, a digital signal processor, a codec chip set, a subscriber identity module card, and the like. The RF circuit 604 may communicate with another terminal by using at least one wireless communication protocol. The wireless communication protocol includes, but not limited to, a metropolitan area network, different generations of mobile communication networks (2G, 3G, 4G, and 5G), a wireless local area network, and/or a wireless fidelity (Wi-Fi) network. In some embodiments, the RF circuit 604 may further include a circuit related to a near field communication (NFC), which is not limited in this application.

The display screen 605 is configured to display a user interface (UI). The UI may include a graphic, a text, an icon, a video, and any combination thereof. When the display screen 605 is a touchscreen, the display screen 605 is further capable of collecting a touch signal on or above a surface of the display screen 605. The touch signal may be inputted into the processor 601 as a control signal for processing. In this case, the display screen 605 may be further configured to provide a virtual button and/or a virtual keyboard, also referred to as a soft button and/or a soft keyboard. In some embodiments, there may be one display screen 605, disposed on a front panel of the terminal 600. In some other embodiments, there may be at least two display screens 605, respectively disposed on different surfaces of the terminal 600 or designed in a foldable shape. In still some other embodiments, the display screen 605 may be a flexible display screen, disposed on a curved surface or a folded surface of the terminal 600. Even, the display screen 605 may be further set in a non-rectangular irregular pattern, that is, a special-shaped screen. The display screen 605 may be manufactured by using a material such as a liquid crystal display (LCD), an organic light-emitting diode (OLED), or the like.

The camera component 606 is configured to capture images or videos. In some embodiments, the camera assembly 606 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera assembly 606 may further include a flash. The flash may be a monochrome temperature flash, or may be a double color temperature flash. The double color temperature flash refers to a combination of a warm flash and a cold flash, and may be configured to perform light ray compensation at different color temperatures.

The audio circuit 607 may include a microphone and a speaker. The microphone is configured to collect sound waves of users and surroundings, and convert the sound waves into electrical signals and input the signals to the processor 601 for processing, or input the signals to the radio frequency circuit 604 to implement voice communication. For stereo collection or noise reduction, there may be a plurality of microphones, disposed at different portions of the terminal 600 respectively. The microphone may further be an array microphone or an omni-directional collection type microphone. The speaker is configured to convert electric signals from the processor 601 or the RF circuit 604 into sound waves. The speaker may be a conventional thin-film speaker or a piezoelectric ceramic speaker. When the speaker is the piezoelectric ceramic speaker, electric signals not only can be converted into sound waves that can be heard by human, but also can be converted into sound waves that cannot be heard by human for ranging and the like. In some embodiments, the audio circuit 607 may further include an earphone jack.

The positioning component 608 is configured to position a current geographic location of the terminal 600, to implement a navigation or a location based service (LBS). The positioning component 608 may be a positioning component based on the Global Positioning System (GPS) of the United States, the BeiDou System of China, the GLONASS System of Russia, or the GALILEO System of the European Union.

The power supply 609 is configured to supply power to components in the terminal 600. The power supply 609 may be an alternating current, a direct current, a primary battery, or a rechargeable battery. When the power supply 609 includes a rechargeable battery, the rechargeable battery may be a wired rechargeable battery or a wireless rechargeable battery. The rechargeable battery may be further configured to support a fast charge technology.

In some embodiments, the terminal 600 may further include one or more sensors 610. The one or more sensors 610 include, but are not limited to, an acceleration sensor 611, a gyroscope sensor 612, a pressure sensor 613, a fingerprint sensor 614, an optical sensor 615, and a proximity sensor 616.

The acceleration sensor 611 may detect a magnitude of acceleration on three coordinate axes of a coordinate system established with the terminal 600. For example, the acceleration sensor 611 may be configured to detect components of gravity acceleration on the three coordinate axes. The processor 601 may control, according to a gravity acceleration signal collected by the acceleration sensor 611, the display screen 605 to display the user interface in a frame view or a portrait view. The acceleration sensor 611 may be further configured to collect motion data of a game or a user.

The gyroscope sensor 612 may detect a body direction and a rotation angle of the terminal 600, and the gyroscope sensor 612 may work with the acceleration sensor 611 to collect a 3D action performed by the user on the terminal 600. The processor 601 may implement the following functions according to data collected by the gyroscope sensor 612: motion sensing (for example, the UI is changed according to a tilt operation of a user), image stabilization during shooting, game control, and inertial navigation.

The pressure sensor 613 may be disposed on a side frame of the terminal 600 and/or a lower layer of the display screen 605. When the pressure sensor 613 is disposed at the side frame of the terminal 600, a holding signal of the user on the terminal 600 may be detected. The processor 601 performs left and right hand recognition or a quick operation according to the holding signal collected by the pressure sensor

613. When the pressure sensor 613 is disposed on the low layer of the display screen 605, the processor 601 controls, according to a pressure operation of the user on the display screen 605, an operable control on the UI. The operable control includes at least one of a button control, a scroll-bar control, an icon control, and a menu control.

The fingerprint sensor 614 is configured to collect a user's fingerprint. The processor 601 identifies a user's identity according to the fingerprint collected by the fingerprint sensor 614, or identifies the user's identity according to the fingerprint collected by the fingerprint sensor 614. When the user's identity is identified as a trusted identity, the processor 601 authorizes the user to perform a related sensitive operation. The sensitive operation includes unlocking a screen, viewing encrypted information, downloading software, payment, changing settings, and the like. The fingerprint sensor 614 may be disposed on a front face, a back face, or a side face of the terminal 600. When a physical button or a vendor logo is disposed on the terminal 600, the fingerprint sensor 614 may be integrated together with the physical button or the vendor logo.

The optical sensor 615 is configured to collect ambient light intensity. In an embodiment, the processor 601 may control display luminance of the display screen 605 according to the ambient light intensity collected by the optical sensor 615. Specifically, when the ambient light intensity is relatively high, the display luminance of the display screen 605 is increased. When the ambient light intensity is relatively low, the display luminance of the display screen 605 is reduced. In another embodiment, the processor 601 may further dynamically adjust a photographing parameter of the camera assembly 606 according to the ambient light intensity collected by the optical sensor 615.

The proximity sensor 616, also referred to as a distance sensor, is generally disposed on the front panel of the terminal 600. The proximity sensor 616 is configured to collect a distance between the user and the front surface of the terminal 600. In an embodiment, when the proximity sensor 616 detects that the distance between the user and the front surface of the terminal 600 gradually becomes smaller, the display screen 605 is controlled by the processor 601 to switch from a screen-on state to a screen-off state. In a case that the proximity sensor 616 detects that the distance between the user and the front surface of the terminal 600 gradually becomes larger, the display screen 605 is controlled by the processor 601 to switch from the screen-off state to the screen-on state.

A person skilled in the art may understand that the structure shown in FIG. 6 does not constitute a limitation on the terminal 600, and the terminal may include more components or fewer components than those shown in the figure, or some components may be combined, or a different component deployment may be used.

Figure 7:
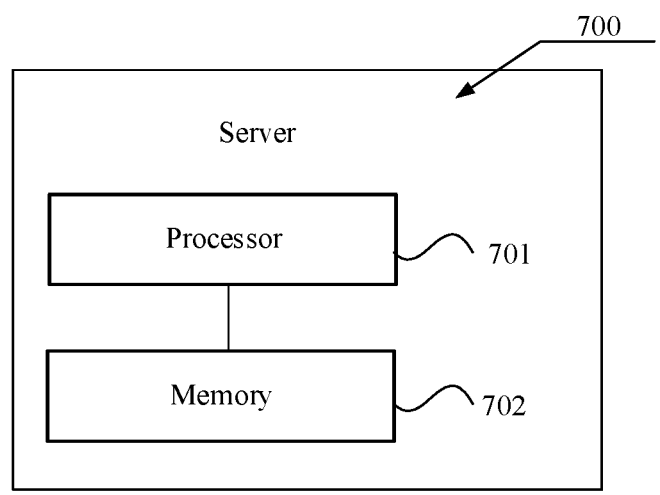
FIG. 7 is a schematic structural diagram of a server according to an embodiment of this application.

FIG. 7 is a schematic structural diagram of a server according to an embodiment of this application. The server 700 may vary greatly according to configuration or performance, and may include one or more processors (central processing unit, CPU) 701 and one or more memories 702. The one or more memories 1002 store at least one piece of program code. The at least one piece of program code is loaded by the one or more processors 1001 to perform the following video clip positioning steps:

determining a candidate clip from a target video based on a plurality of video frames in the target video and a target text, a degree of matching between the candidate clip and the target text meeting a first matching condition;

determining at least one sub-clip from the candidate clip based on a plurality of video frames in the candidate clip and the target text, a degree of matching between a video frame included in the at least one sub-clip and the target text meeting a second matching condition; and determining, as a target video clip, a sub-clip that is in the at least one sub-clip and that has a degree of matching with the target text meeting a target condition.

Certainly, the server 700 may also have a wired or wireless network interface, a keyboard, an input/output interface and other components to facilitate input/output. The server 700 may also include other components for implementing device functions. Details are not described herein again.

In an exemplary embodiment, a computer-readable storage medium is further provided, for example, a memory including instructions that may be loaded by a processor to perform the following video clip positioning steps:

determining a candidate clip from a target video based on a plurality of video frames in the target video and a target text, a degree of matching between the candidate clip and the target text meeting a first matching condition;

determining at least one sub-clip from the candidate clip based on a plurality of video frames in the candidate clip and the target text, a degree of matching between a video frame included in the at least one sub-clip and the target text meeting a second matching condition; and determining, as a target video clip, a sub-clip that is in the at least one sub-clip and that has a degree of matching with the target text meeting a target condition.

In one implementation, the instructions may be loaded by the processor to perform the following steps:

respectively acquiring degrees of matching between video frame features of the plurality of video frames in the candidate clip and a text feature;

acquiring a plurality of target video frames from the plurality of video frames, a degree of matching between a video frame feature of one target video frame and the text feature meeting the second matching condition; and determining the at least one sub-clip based on at least one group of consecutive video frames in the plurality of target video frames.

In one implementation, the instructions may be loaded by the processor to perform the following step:

using, for each group of consecutive video frames, the first video frame in the group of consecutive video frames as a start video frame, and using the last video frame as an end frame, to acquire a sub-clip corresponding to the group of consecutive video frames.

In one implementation, the instructions may be loaded by the processor to perform the following steps:

respectively mapping the video frame features of the plurality of video frames in the candidate clip and the text feature to a vector space, and extracting key information from mapping results to acquire a plurality of intermediate video frame features and an intermediate text feature; and determining the degrees of matching between the video frame features of the plurality of video frames and the text feature based on the plurality of intermediate video frame features and the intermediate text feature.

In one implementation, the instructions may be loaded by the processor to perform the following step:

performing boundary extension on the candidate clip based on a start moment and an end moment of the candidate clip in the target video.

In one implementation, the instructions may be loaded by the processor to perform the following steps:

acquiring a plurality of first video features based on video frame features of video frames in a plurality of video clips of the target video, one first video feature being used for representing a feature of one video clip;

acquiring a text feature of the target text; and respectively acquiring degrees of matching between the plurality of first video features and the text feature, and using, as the candidate clip, a video clip corresponding to a first video feature that has a degree of matching with the text feature meeting the first matching condition.

In one implementation, two adjacent video clips of the plurality of video clips have an overlapping portion.

In one implementation, the instructions may be loaded by the processor to perform the following step:

respectively mapping the video frame features of the video frames in the plurality of video clips, and performing maximum pooling processing on mapped video frame features of the video clips to acquire the plurality of first video features.

In one implementation, the instructions may be loaded by the processor to perform the following steps:

inputting the target text into a long short-term memory network; and acquiring a plurality of target hidden layer states generated by the long short-term memory network as the text feature of the target text.

The computer-readable storage medium may be a read-only memory (ROM), a RAM, a compact disc ROM (CD-ROM), a magnetic tape, a floppy disk, an optical data storage device, or the like.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A video clip positioning method, applied to a computer device, the method comprising:

determining a candidate clip from a target video based on a plurality of video frames in the target video and a target text using a feature encoder including a convolutional neural network and a bidirectional long short-term memory network, a degree of matching between the candidate clip and the target text meeting a first matching condition, further including:

acquiring a plurality of first video features based on video frame features of video frames in a plurality of video clips of the target video using the convolutional neural network, one first video feature being used for representing a feature of one video clip;

acquiring a text feature of the target text using the long short-term memory network; and respectively acquiring degrees of matching between the plurality of first video features and the text feature, and using, as the candidate clip, a video clip corresponding to a first video feature that has a degree of matching with the text feature meeting the first matching condition;

performing boundary extension on the candidate clip to adjust a length of the candidate clip, wherein the boundary extension amount of the candidate clip is a function based on a duration of the target video, an original length of the candidate clip, a start moment and an end moment of the candidate clip in the target video;

determining at least one sub-clip from the candidate clip based on a plurality of video frames in the candidate clip and the target text, a degree of matching between a video frame comprised in the at least one sub-clip and the target text meeting a second matching condition; and determining, as a target video clip, a sub-clip that is in the at least one sub-clip and that has a degree of matching with the target text and a similarity between the candidate clip and the sub-clip collectively meeting a target condition.

2. The method according to claim 1, wherein the determining at least one sub-clip from the candidate clip based on a plurality of video frames in the candidate clip and the target text comprises:

respectively acquiring degrees of matching between video frame features of the plurality of video frames in the candidate clip and a text feature;

acquiring a plurality of target video frames from the plurality of video frames, a degree of matching between a video frame feature of one target video frame and the text feature meeting the second matching condition; and determining the at least one sub-clip based on at least one group of consecutive video frames in the plurality of target video frames.

3. The method according to claim 2, wherein the determining the at least one sub-clip based on at least one group of consecutive video frames in the plurality of target video frames comprises:

using, for each group of consecutive video frames, the first video frame in the group of consecutive video frames as a start video frame, and using the last video frame as an end video frame, to acquire a sub-clip corresponding to the group of consecutive video frames.

4. The method according to claim 2, wherein the respectively acquiring degrees of matching between video frame features of the plurality of video frames in the candidate clip and a text feature comprises:

respectively mapping the video frame features of the plurality of video frames in the candidate clip and the text feature to a vector space, and extracting key information from mapping results to acquire a plurality of intermediate video frame features and an intermediate text feature; and determining the degrees of matching between the video frame features of the plurality of video frames and the text feature based on the plurality of intermediate video frame features and the intermediate text feature.

5. The method according to claim 1, wherein two adjacent video clips of the plurality of video clips have an overlapping portion.

6. The method according to claim 1, wherein the acquiring a plurality of first video features based on video frame features of video frames in a plurality of video clips of the target video comprises:

respectively mapping the video frame features of the video frames in the plurality of video clips; and performing maximum pooling processing on mapped video frame features of the video clips to acquire the plurality of first video features.

7. The method according to claim 1, wherein the acquiring a text feature of the target text comprises:

inputting the target text into the long short-term memory network; and acquiring a plurality of target hidden layer states generated by the long short-term memory network as the text feature of the target text.

8. A computer device, comprising one or more processors and one or more memories, the one or more memories storing one or more programs, and the one or more processors being configured to execute the one or more programs to perform a plurality of video clip positioning operations including:

determining a candidate clip from a target video based on a plurality of video frames in the target video and a target text using a feature encoder including a convolutional neural network and a bidirectional long short-term memory network, a degree of matching between the candidate clip and the target text meeting a first matching condition, further including:

acquiring a plurality of first video features based on video frame features of video frames in a plurality of video clips of the target video using the convolutional neural network, one first video feature being used for representing a feature of one video clip;

acquiring a text feature of the target text using the long short-term memory network; and respectively acquiring degrees of matching between the plurality of first video features and the text feature, and using, as the candidate clip, a video clip corresponding to a first video feature that has a degree of matching with the text feature meeting the first matching condition;

performing boundary extension on the candidate clip to adjust a length of the candidate clip, wherein the boundary extension amount of the candidate clip is a function based on a duration of the target video, an original length of the candidate clip, a start moment and an end moment of the candidate clip in the target video;

determining at least one sub-clip from the candidate clip based on a plurality of video frames in the candidate clip and the target text, a degree of matching between a video frame comprised in the at least one sub-clip and the target text meeting a second matching condition; and determining, as a target video clip, a sub-clip that is in the at least one sub-clip and that has a degree of matching with the target text and a similarity between the candidate clip and the sub-clip collectively meeting a target condition.

9. The computer device according to claim 8, wherein the determining at least one sub-clip from the candidate clip based on a plurality of video frames in the candidate clip and the target text comprises:

respectively acquiring degrees of matching between video frame features of the plurality of video frames in the candidate clip and a text feature;

acquiring a plurality of target video frames from the plurality of video frames, a degree of matching between a video frame feature of one target video frame and the text feature meeting the second matching condition; and determining the at least one sub-clip based on at least one group of consecutive video frames in the plurality of target video frames.

10. The computer device according to claim 9, wherein the determining the at least one sub-clip based on at least one group of consecutive video frames in the plurality of target video frames comprises:

using, for each group of consecutive video frames, the first video frame in the group of consecutive video frames as a start video frame, and using the last video frame as an end video frame, to acquire a sub-clip corresponding to the group of consecutive video frames.

11. The computer device according to claim 9, wherein the respectively acquiring degrees of matching between video frame features of the plurality of video frames in the candidate clip and a text feature comprises:

respectively mapping the video frame features of the plurality of video frames in the candidate clip and the text feature to a vector space, and extracting key information from mapping results to acquire a plurality of intermediate video frame features and an intermediate text feature; and determining the degrees of matching between the video frame features of the plurality of video frames and the text feature based on the plurality of intermediate video frame features and the intermediate text feature.

12. The computer device according to claim 8, wherein two adjacent video clips of the plurality of video clips have an overlapping portion.

13. The computer device according to claim 8, wherein the acquiring a plurality of first video features based on video frame features of video frames in a plurality of video clips of the target video comprises:

respectively mapping the video frame features of the video frames in the plurality of video clips; and performing maximum pooling processing on mapped video frame features of the video clips to acquire the plurality of first video features.

14. The computer device according to claim 8, wherein the acquiring a text feature of the target text comprises:

inputting the target text into the long short-term memory network; and acquiring a plurality of target hidden layer states generated by the long short-term memory network as the text feature of the target text.

15. A non-transitory computer-readable storage medium, storing one or more programs, the one or more programs being executed by a processor to perform a plurality of video clip positioning operations including:

determining a candidate clip from a target video based on a plurality of video frames in the target video and a target text using a feature encoder including a convolutional neural network and a bidirectional long short-term memory network, a degree of matching between the candidate clip and the target text meeting a first matching condition, further including:

acquiring a plurality of first video features based on video frame features of video frames in a plurality of video clips of the target video using the convolutional neural network, one first video feature being used for representing a feature of one video clip;

acquiring a text feature of the target text using the long short-term memory network; and respectively acquiring degrees of matching between the plurality of first video features and the text feature, and using, as the candidate clip, a video clip corresponding to a first video feature that has a degree of matching with the text feature meeting the first matching condition;

performing boundary extension on the candidate clip to adjust a length of the candidate clip, wherein the boundary extension amount of the candidate clip is a function based on a duration of the target video, an original length of the candidate clip, a start moment and an end moment of the candidate clip in the target video;

determining at least one sub-clip from the candidate clip based on a plurality of video frames in the candidate clip and the target text, a degree of matching between a video frame comprised in the at least one sub-clip and the target text meeting a second matching condition; and determining, as a target video clip, a sub-clip that is in the at least one sub-clip and that has a degree of matching with the target text and a similarity between the candidate clip and the sub-clip collectively meeting a target condition.

16. The non-transitory computer-readable storage medium according to claim 15, wherein the determining at least one sub-clip from the candidate clip based on a plurality of video frames in the candidate clip and the target text comprises:

respectively acquiring degrees of matching between video frame features of the plurality of video frames in the candidate clip and a text feature;

acquiring a plurality of target video frames from the plurality of video frames, a degree of matching between a video frame feature of one target video frame and the text feature meeting the second matching condition; and determining the at least one sub-clip based on at least one group of consecutive video frames in the plurality of target video frames.

17. The non-transitory computer-readable storage medium according to claim 16, wherein the determining the at least one sub-clip based on at least one group of consecutive video frames in the plurality of target video frames comprises:

using, for each group of consecutive video frames, the first video frame in the group of consecutive video frames as a start video frame, and using the last video frame as an end video frame, to acquire a sub-clip corresponding to the group of consecutive video frames.

* * * * *